United States Patent [19]

Bianco

[11] 4,359,633
[45] Nov. 16, 1982

[54] SPECTRALLY-LIMITED BAR-CODE LABEL AND IDENTIFICATION CARD

[76] Inventor: James S. Bianco, 217 Brainard Rd., Enfield, Conn. 06082

[21] Appl. No.: 201,418

[22] Filed: Oct. 28, 1980

[51] Int. Cl.³ .............................................. G06K 7/12
[52] U.S. Cl. .................................. 235/468; 235/462; 235/465
[58] Field of Search .................. 40/2.2; 235/468, 462, 235/465

[56] References Cited

U.S. PATENT DOCUMENTS 3,829,662  8/1974  Furahashi ............................ 235/468

Primary Examiner—Harold I. Pitts
Attorney, Agent, or Firm—Pennie & Edmonds

[57] ABSTRACT

A label or identification card has a base with a region which absorbs invisible light and a region which reflects invisible light. Both regions absorb visible light over a predetermined spectral range. A filter is disposed on the base. The filter transmits both invisible light and visible light over the said spectral range, while absorbing visible light over the spectral range outside the said range absorbed by the two regions of the base. Accordingly, the unaided human eye cannot perceive the information represented by the array of the regions on the base, while this array can be detected by scanning with invisible light. In one embodiment, the bar code is a return-to-zero double frequency code.

14 Claims, 4 Drawing Figures

SPECTRALLY-LIMITED BAR-CODE LABEL AND IDENTIFICATION CARD

BACKGROUND OF THE INVENTION

1. Technical Field

This invention pertains to the technical field of documents designed to store information in a manner not visible to the unaided human eye, for the purpose of preserving the confidentiality of the information, and limiting its use to authorized persons. Specifically, the invention pertains to a label or identification card bearing concealed information in the form of a bar code to control access to an area or a machine, for example. Such a label or card may be used in a factory, an office, a military installation, or any other place in which security is desirable.

2. Background Art

Various card systems are known in the prior art, by which optically readable information may be stored in a concealed manner. Typically, an identification card may contain indicia which are rendered perceptible only when exposed to light beyond the visible spectrum. The indicia may be covered by a barrier permeable to invisible light, such as ultraviolet or infrared, while being opaque to light in the visible spectrum.

The indicia may be, for example, holes in a metal plate, fluorescent material, spots of ink, or a plastic with a sharp single-frequency absorption characteristic. See, e.g., U.S. patents:

| | | |
|---|---|---|
| 3,239,815 | 3,477,156 | 3,802,101 |
| 3,245,697 | 3,536,894 | 3,829,662 |
| 3,455,577 | 3,621,249 | 3,919,447 |
| 3,468,046 | 3,640,009 | 4,044,231 |

The systems known in the prior art are subject to various disadvantages. A barrier sufficiently permeable to invisible light, while at the same time opaque to visible light, is generally costly. If the opaque barrier is not sufficiently permeable to invisible light, then the reader which scans the invisible light must be built to much more demanding specifications at commensurately higher cost, or its performance will be detrimentally affected by the less than adequate permeability.

Those systems which require the use of fluorescent material to render the indicia perceptible are disadvantageous, in that such a material may be costly, especially if it must be incorporated into each card or label, of which there may be hundreds or even thousands in a single installation.

Those systems which employ holes in a metal or plastic plate or sheet as the indicia are disadvantageous, in that such holes can not easily be closely-spaced. The closer the spacing, the more difficult it is to maintain manufacturing tolerances. Accordingly, the information density is limited. Such systems are particularly unsuitable for use with bar-coded information.

It is also known in the art to use ID cards having a magnetic stripe on which is recorded data for reading by a magnetic head. Such data is not visible to the unaided eye. However, the magnetic strip is subject to attack by acetone and similar chemicals, which take off the layer with the magnetic oxide and hence destroy the recording. An overlay of plastic can protect against acetone but it cannot be used because of the absolute necessity for close spacing between the magnetic read head and the magnetic stripe. With the ordinary read heads employed, lack of close spacing degrades the signal too much, and the only alternative is much more expensive read heads which could accurately read across the gap.

A magnetic reader for this type of card is generally in the form of a slot into which the card is inserted. A spring loaded plate forces the card into an arc, hence its need for flexibility. The card is in essence wrapped around the read head to assure adequate and continuous firm contact between the head and the magnetic stripe. The sides of the slot align the card with respect to the head to prevent skew errors. The closeness between the read head and the card means that there can be no environmental barrier between the slot and the head, so the latter is subject to dirt, moisture and other environmental degradation. The necessary thinness of the card leads to a relatively short lifetime. Perhaps most importantly, the magnetic data is subject to degaussing by any strong magnetic field, including those normally encountered in plants due to machinery.

DISCLOSURE OF THE INVENTION

According to the present invention, coded information or indicia are hidden from the unaided human eye, but are not hidden by means of a barrier which itself is opaque to visible light or by being magnetically recorded. Rather, the invention involves concealing the indicia with a colored filter transparent to a part of the visible spectrum and transparent to invisible radiation. This filter, in conjunction with the spectral characteristics of the code indicia and base on which the indicia are carried, renders the indicia invisible to the naked eye yet detectable with radiation outside the visible spectrum. The colors of the filter and base must be suitably chosen so as to absorb substantially all visible light, while respectively transmitting and reflecting invisible light without a substantial reduction in intensity. For example, suitable colors are red and blue.

The invention achieves significant advantages over the prior art. A material which is, in a single layer, opaque to visible light and readily permeable to invisible light is relatively expensive. By using a colored filter transparent to visible light of a limited spectral composition, the high cost of an opaque barrier material can be significantly reduced. Moreover, performance is improved, since in general opaque materials significantly reduce the intensity of invisible radiation transmitted through them, requiring a relatively expensive reader to achieve acceptable reading accuracy.

Advantages over magnetic systems are pronounced. The card may be read by a point light source, so that skew errors in the reader are minimal. The slot in the reader to read the card may have a transparent environmental barrier, since the reader can operate at a distance from the card. This same feature permits a protective overlay on the card, including the data stripe. A substantially heavier card is allowed, since there is no need for flexibility for reading purposes, which will greatly add to the durability of the card.

Generally, the card according to the invention does not have any of the disadvantages enumerated above with respect to magnetic data stripe cards and optically readable cards known in the prior art.

BRIEF DESCRIPTION OF THE DRAWINGS

Preferred embodiments of the invention will be further explained with reference to the accompanying drawings, in which.

BEST MODE FOR PRACTICING THE INVENTION

The invention will now be described in detail, with reference to the accompanying FIGS. 1, 2, 3 and 4.

Figure 1:
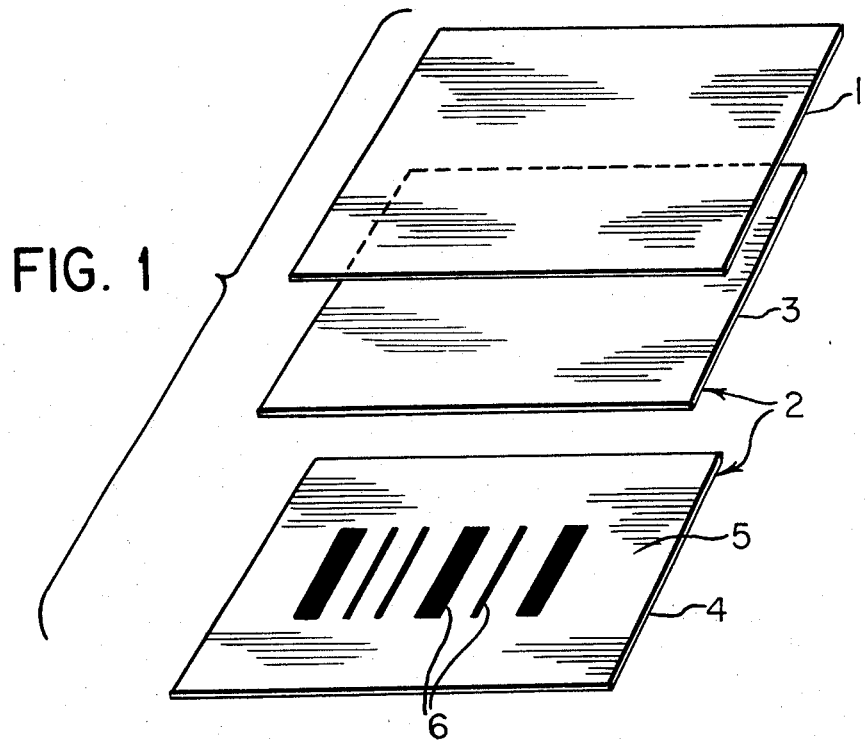
FIG. 1 is an exploded perspective view of an embodiment of the invention.

With reference to FIG. 1, indicia 6 are concealed from the human eye in the following manner. Filter 1 is a sheet of commercially-available plastic such as SCOTCH brand Lithographer Tape #616, manufactured by 3M; or a 2 mil polyester (MYLAR) film available, for example, from Flex-Con Co., Inc., Wall St., Spencer, Mass. 01562. (This film may be purchased with Flex-Con's "V-22" clear acrylic adhesive and "150" poly release liner). Typically, the color of filter 1 will be a transparent red; i.e., filter 1 generally absorbs light in the blue region of the visible spectrum, and transmits light in the red region of the visible spectrum. Filter 1 also transmits invisible light, such as infrared light.

Filter 1 is placed upon and affixed to base 2, which comprises an overlay 3 and a support 4, provided with a surface 5.

Overlay 3 is of a plastic similar to that of filter 1, available from the same source, except that the color of overlay 3 is a transparent blue, if the color of filter 1 is transparent red, and vice versa. Overlay 3 also transmits invisible light, such as infrared light.

Arrayed on surface 5 are indicia 6. Indicia 6 comprise a bar code, in accordance with a preferred embodiment of the invention. A bar code is an array of bars of a predetermined width and spacing, and which contrast with background surface 5, for the purpose of conveying information. Such bar codes are well known, and, for example, are often used on consumer products purchased in supermarkets.

Indicia 6 are arrayed on surface 5 of support 4. Support 4 may be made of a commercially-available plastic, such as MYLAR brand polyester; or of paper, which may be plain bond paper (4 mils thick). Typically, indicia 6 will comprise a bar code, printed on surface 5 in a commercially available black ink. Such ink should absorb substantially all visible light, as well as invisible light, such as infrared. If the indicia are to be scanned with infrared light, then the black ink should contain carbon or another material which absorbs infrared light. The portions of surface 5 not occupied by indicia 6 must reflect at least invisible light, such as infrared; and may also, in this embodiment, reflect visible light. For example, said portions of surface 5 may be white.

When light strikes filter 1 (assuming it is transparent red), only visible light in the red region of the spectrum (and invisible light, such as infrared) is transmitted. Visible light of other wavelengths is absorbed. When this transmitted light in the red region of the visible spectrum reaches overlay 3, which is transparent blue, it is substantially absorbed thereby (while the invisible light is transmitted through overlay 3).

As a result, little light in the visible region of the spectrum illuminates surface 5 and the indicia 6 thereon. Surface 5 and indicia 6 are thereby concealed from view by the unaided eye, and appear uniformly black or dark.

Since filter 1 and overlay 3 substantially transmit, and do not substantially absorb, invisible light such as infrared light, surface 5 and indicia 6 thereon may easily be illuminated by invisible light, such as infrared. Such light is absorbed by indicia 6, but is reflected by that portion of surface 5 not occupied by indicia 6. Such reflected light, which easily returns through overlay 3 and filter 1, may then be sensed by any conventional detector of invisible light, as is well-known in the art. Such a detector may comprise, for example, an infrared bar-code reader in the form of a hand-held portable unit, or a fixedly installed unit.

The reader may be, for example, a Hewlett-Packard model HEDS 1000. Note that the spectral response of this reader is not strictly limited to light invisible to the human eye, but encompasses some degree of visible light as well. This is acceptable in accordance with the invention provided that the visible light sensitivity of the reader is low compared to its sensitivity to invisible light.

Figure 2:
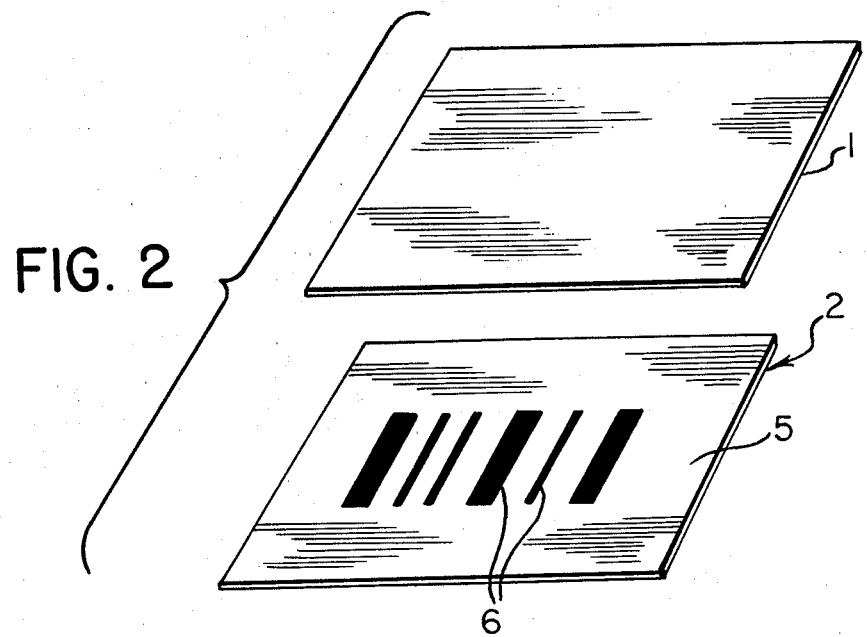
FIG. 2 is an exploded perspective view of another embodiment of the invention.

With reference to FIG. 2, a description of another embodiment of the invention will be provided. The embodiment of FIG. 2 differs from that of FIG. 1 in that it does not include an overlay 3. Rather, the function of overlay 3 is fulfilled by an ink wash (not shown) deposited on at least the portion of surface 5 not occupied by indicia 6.

Typically, where filter 1 is transparent red, as above-described, the ink wash deposited on the portion of surface 5 not occupied by indicia 6 will be blue. A commercially-available blue ink that does not contain carbon, such as is found in MAGIC MARKER brand and LIQUID CRAYON brand marking pens may be used. When the aforesaid commercially-available marking pens are used, the ink wash may be applied by hand with these pens. The ink wash of the embodiment of FIG. 2 operates to absorb light in the red region of the visible spectrum just as does overlay 3 of the embodiment of FIG. 1.

Since an ink wash is less expensive than an independent overlay, and since direct lamination of filter 1 to surface 5 tends to insure that any attempt to delaminate the card will result in indicia 6 being rendered illegible, the embodiment of FIG. 2 is preferred.

It is also possible to dispense with the need for a separate manufacturing step involving the application of an ink wash, if base 2 is manufactured from a material which is available in a suitable color, such as blue. Such a material may be, for example, paper.

Figure 3:
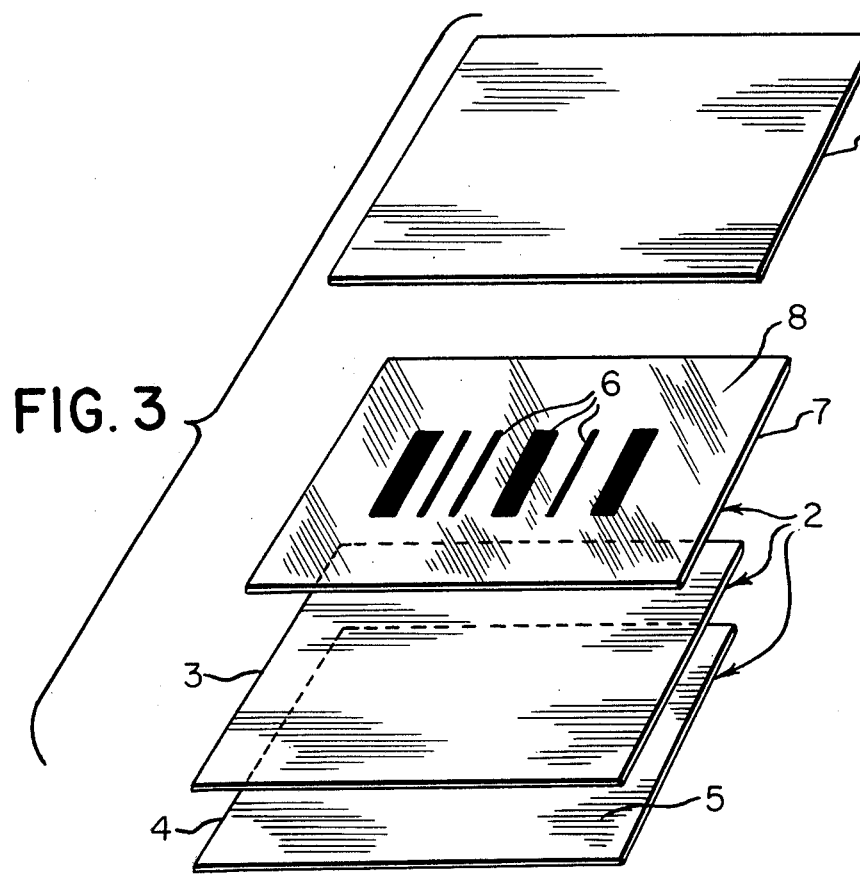
FIG. 3 is an exploded perspective view of yet another embodiment of the invention.

With reference to FIG. 3, a description of yet another embodiment of the invention will be provided. In this embodiment, filter 1, overlay 3 and support 4 are substantially as described with reference to FIG. 1. However, indicia 6, rather than being arrayed on surface 5 of support 4 as in the embodiment of FIG. 1, are arrayed on surface 8 of a film 7, which is placed between filter 1 and overlay 3. Film 7, overlay 3 and support 4 together comprise base 2.

Film 7 may be ordinary photographic (black and white negative) film. The film should have a thin support layer of transparent plastic (such as acetate), coated with a photographic emulsion. On exposure to light and chemical development, the emulsion is removed from those portions of film 7 which it is intended should be transparent; whereas those portions intended to represent the bar-coded indicia 6, are rendered black. Due to the silver content of these black portions, they are highly absorbent to infrared light.

Use of a photographic film to carry the bar-coded indicia 6 is advantageous, in that accuracy and reproducibility of the code are enhanced in comparison to the use of the ordinary method of printing the indicia 6 on a paper support such as support 4 by means of impact printing methods.

Advantageously, film 7 is arranged so that its emulsion side (surface 8) is adjacent to filter 1. This brings indicia 6 closer to the reader, and provides better reader performance.

Figure 4:
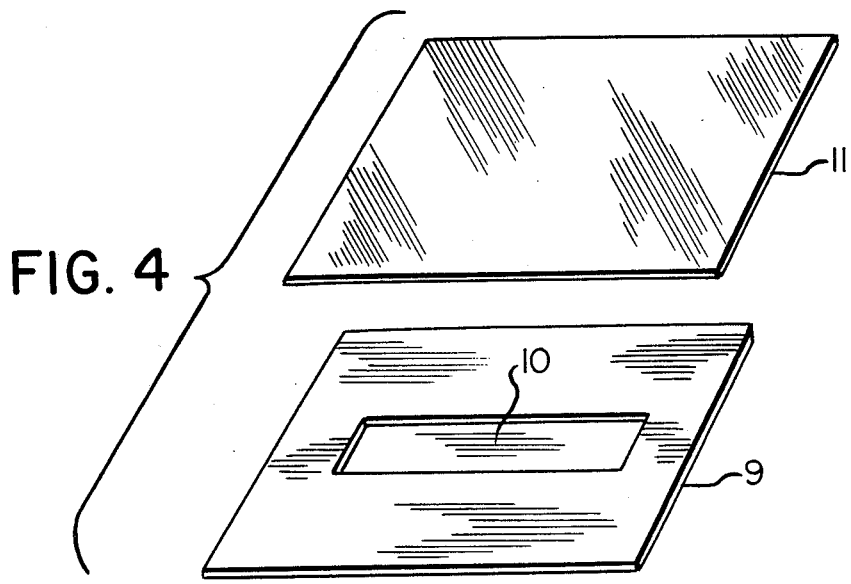
FIG. 4 is a perspective view of an identification card adapted to receive the invention.

With reference to FIG. 4, a method of employing the invention in an identification card adapted to receive coded information in accordance with the invention will be explained.

Card 9 is a wallet-size identification card, made of a commercially-available material such as polyester. Card 9 is provided with a recess 10. An embodiment of the invention, as described above with reference to FIGS. 1, 2 and 3, may be received in recess 10. A thin sheet 11 of transparent material will be laminated over card 9 and recess 10 for purposes of protection.

Prior to lamination the top of filter 1 is advantageously coated with a primer, such as PHOTO-COAT primer sold by Graphic Laminating, Inc., 5122 St. Clair Ave., Cleveland, Ohio 44103. This primer can be sprayed on, for example, with spray tool #8010 and power-pack #8011 of Crown Industrial Products Co., Hebron, Ill. 60034.

The identification card may have a second recess and cover sheet for an ID photo (photograph of an authorized user) on the opposite side from recess 10. The card can be prepared with front and rear cover flaps of transparent material affixed along one edge, ready to receive the assembly of FIGS. 1, 2 or 3 on one side and an ID photo on the other side. If it is desired to seal the assembly of FIGS. 1, 2 or 3 into the card, and under cover sheet 11, before an ID photo is similarly sealed into the second recess on the opposite side of the card from recess 10, then during the lamination process that second recess is advantageously filled temporarily with a polyester filler sheet covered by a release liner to prevent unwanted sealing of the transparent cover for the ID photo recess during the lamination process.

The lamination process is accomplished by placing the assembly ready for lamination in, for example, a conventional 4" pouch laminator set at 360° F. Such a laminator can be obtained from Graphic Laminating, Inc., Cleveland, Ohio. Ideally, the layers to be laminated have been pre-coated with a clear acrylic adhesive, such as Flex-Con's "V-22" clear acrylic adhesive. A release liner, such as Flex-Con's "150" poly release liner, keeps the layers from bonding to each other prior to the desired time; just prior to lamination, the release liners of the layers are removed and discarded, the layers are arranged as above described, and the assembly is placed in the pouch laminator and laminated.

Note that other methods of assembly may be used as will be apparent to one skilled in the art on the basis of the instant disclosure. The colors of filter 1 and overlay 3 (or surface 5 in the embodiment of FIG. 2) may be reversed, so that filter 1 is blue and overlay 3 is red. It has been empirically observed that such a color reversal has an adverse effect on performance of the invention according to the embodiments of FIG. 1 and FIG. 2, particularly on the obtainable signal-to-noise ratio, when infrared light is used to scan the indicia; but that such a color reversal enhances performance of the invention according to FIG. 3. The reason for this difference between the embodiments is not known.

Colors other than red and blue may be employed, provided the colors employed are suitably chosen so that substantially all visible light is absorbed by the combination of filter 1 and overlay 3 (or surface 5, in the embodiment of FIG. 2), while invisible light is transmitted (or reflected) without substantial reduction in intensity. For example, the colors employed could be orange instead of red; or green instead of blue.

Overlay 3 (or filter 1) may be permanently laminated to base 2 by a commercially available adhesive, such as V-22 clear acrylic adhesive available from Flex-Con Co., Inc., Spencer, Mass.; or by any other method of lamination known in the art. Advantageously, the lamination accomplishes a permanent bond, so that any attempt at delamination will result in destruction of the indicia 6 to the extent that they become illegible. The adhesives used to bond the several layers should be as transparent as possible to invisible light, and should reflect or refract as little invisible light as possible.

Indicia (such as writing) visible to the human eye can be placed on the top surface of sheet 11. Such indicia can be deposited on filter 1 in the form of a white ink, or such other color as suitably contrasts with the black or dark appearance of filter 1 (when laminated to base 2). The ink used must be capable of adhering well to filter 1, and forming a thin but durable coating. The ink must be substantially transparent to invisible light. Such ink may be, for example, a flexible invisible ink such as manufactured by General Formulation Company.

Although the invention can function with any type of bar code, it is particularly advantageous to utilize it in conjunction with a type of bar code which we term "Return-to-zero (RZ) double frequency (F/2F)".

The application of non-return-to-zero (NRZ) double frequency (F/2F) coding to magnetic media is well known, and is described, for example, in Computer Design, June 1973, p. 60, and in the IBM manual designated Program No. 5798-NQJ, IBM Series 1 Controlled Access System (SB 30-1177Q) p. 3-1.

In RZ F/2F coding, a bit cell always commences with a clock bit, which may be represented by a black bar. All such bars are of a predetermined width, such as 10 mils. The bars representing the clock bits are spaced a predetermined distance from each other, such as 30 mils, so that each bit cell has a uniform width.

If it is desired to indicate a data bit "0", then the space between the clock bits is left blank. If it is desired to indicate a data bit "1", then the clock bit can be followed, at a distance of 10 mils, by a black bar 10 mils wide.

Alternatively, the clock and data bits may be represented by white spaces defined against a black background. However, whether the code is represented by white on black or black on white, all clock and all data bits must be uniformly of the same color (whether black or white). It is this feature which characterizes the code as a return-to-zero (RZ) code, since there is always a return to the zero state (whether that state is uniformly represented by black or by white) before and after each clock and data bit.

The code is characterized as double frequency (2F), since a bit cell containing a "1" has twice the number of white to black (or black to white) transitions, as a bit cell containing a "0".

The foregoing coding system is advantageous, since state of the art optical readers can more reliably detect the distance between like transitions (all black to white or all white to black) than the distance between unlike transitions (some white to black, some black to white).

The invention is not limited to the exact embodiments described, but comprises such further variations, as will be apparent to one skilled in the art on the basis of the foregoing disclosure and the following claims.

I claim:

1. An article for storing information in a form substantially concealed from the unaided human eye, comprising:

a base member forming a surface having at least one first region and at least one second region arrayed thereon in accordance with a predetermined information code, said first region being adapted substantially to absorb and said second region being adapted substantially to reflect invisible radiation in a first predetermined spectral range; said first and second regions being further adapted substantially to absorb visible radiation in a second predetermined spectral range; and means forming a filter disposed on said surface for transmitting radiation in at least said first and second predetermined spectral ranges and for substantially absorbing visible radiation outside said second predetermined spectral range.

2. An article according to claim 1, said predetermined information code being a bar code, and said surface being provided with a plurality of said first regions.

3. An article according to claim 1, said first predetermined spectral range being a range within the infrared spectrum.

4. An article according to claim 3, said second predetermined spectral range being a range within the low-frequency portion of the visible spectrum.

5. An article according to claim 3, said second predetermined spectral range being a range within the red-orange portion of the visible spectrum.

6. An article according to claim 4, said first region comprising carbon-containing black ink, said second region comprising blue or green ink, and said means forming a filter comprising transparent red or orange plastic.

7. An article according to claim 6, said means forming a filter being bonded to said surface whereby an attempt to remove said filter means from said surface substantially destroys the information residing in the array of said first and second regions.

8. An article according to claim 4, said base comprising a support and an overlay of transparent blue or green material disposed on said support.

9. An article according to claim 3, said second predetermined spectral range being a range within the high-frequency portion of the visible spectrum.

10. An article according to claim 3, said second predetermined spectral range being a range within the blue-green portion of the visible spectrum.

11. An article according to claim 9, said base comprising a support, an overlay of transparent red or orange material disposed on said support, and a photographic film bearing the image of a bar code; said photographic film being disposed on said overlay.

12. An article according to claim 1, said base comprising a support and an overlay of transparent colored material disposed on said support.

13. An article according to claim 1, said base comprising a support, an overlay of transparent colored material disposed on said support, and a photographic film bearing the image of a bar code; said photographic film being disposed on said overlay.

14. An article according to claim 1, said filter having a surface bearing indicia visible to the unaided human eye, said indicia being substantially transparent to invisible light.

* * * * *